UNITED STATES PATENT OFFICE.

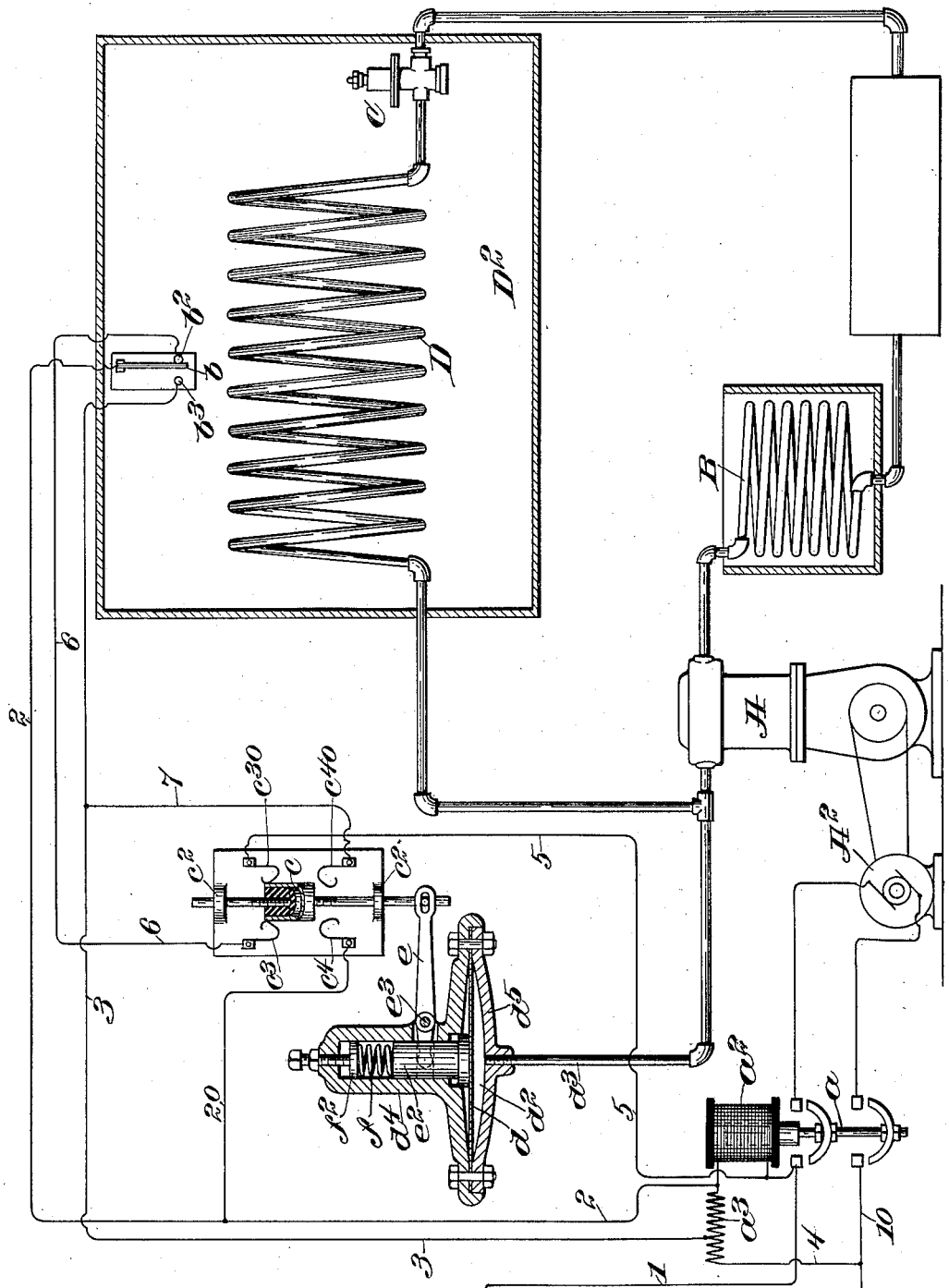

EUGENE CARPENTER, OF NEWTON, MASSACHUSETTS.

REFRIGERATING SYSTEM.

946,771.  Specification of Letters Patent.  Patented Jan. 18, 1910.

Application filed December 2, 1907. Serial No. 404,672.

*To all whom it may concern:*

Be it known that I, EUGENE CARPENTER, a citizen of the United States, residing in Newton, in the county of Middlesex and State of Massachusetts, have invented an Improvement in Refrigerating Systems, of which the following description, in connection with the accompanying drawings, is a specification, like letters on the drawings representing like parts.

The present invention relates to a refrigerating system and is embodied in a combination with such a system of a controlling device arranged to respond directly to an increase of pressure in the refrigerating pipes in addition to the controlling device now commonly employed which responds to changes of temperature in the chamber which is cooled by the system.

The purpose of the invention is to take care of the excess pressure in the refrigerating pipes in cases where the temperature to be maintained in the chamber which is being cooled is considerably above the freezing point. The device is mainly intended for use in cases where the temperature which is to be maintained by the cooling device is 50° Fahrenheit, or over, so that the expanding gases in the cooling pipes contain a pressure which it is difficult to confine in the piping system, thereby causing leakage. This high pressure will be produced before the temperature of the chamber which is being cooled increases to a degree sufficient to control the compressing apparatus through the agency of a thermostat, and in accordance with the present invention a secondary controlling device operated directly by the pressure in the refrigerating pipes is employed to start the condensing pump from time to time and keep the pressure down to a degree which can be handled with safety.

The invention is herein shown as embodied in a refrigerating system in which the compressing apparatus is controlled by an electric switch, the operation of which in turn is normally controlled by the action of a thermostat so arranged as to close the switch and set the compressing apparatus in operation when the temperature of the chamber being cooled rises to a certain point. In accordance with the invention, a secondary circuit controller is employed which is arranged to be operated by pressure of the gases in the system so as to start the compressing apparatus when said pressure rises beyond a certain point regardless of the temperature of the chamber which is being cooled.

The drawing is a diagram of the system embodying the invention, the regulating device which forms the main feature of the invention being shown on an enlarged scale and in section.

The system in which the invention is embodied consists, as usual, of the compressing pump A, condenser coil B, the expansion valve C and the refrigerating coils D which are within the chamber $D^2$ from which the heat is to be extracted to maintain the temperature at a given point. In the construction shown, the compressor pump A is arranged to be driven by an electromotor $A^2$, the circuit through the motor being controlled by a bi-polar switch $a$ which is under the control of a solenoid $a^2$. The switch $a$ is so arranged as to be closed when the solenoid is fully energized, there being a continuous circuit through the said solenoid $a^2$ and a resistance $a^3$ which carries current enough to maintain the switch closed but not enough to close the switch when open. The circuit through the solenoid is primarily controlled by means of a thermostat $b$ in the chamber $D^2$, the said thermostat being herein conveniently shown as a member adapted to be moved through the agency of temperature changes from a contact $b^2$ to a contact $b^3$. In the position shown, the apparatus is at rest, and in order to start the same the member $b$ is moved through a change in temperature, or otherwise, from its engagement with the contact $b^2$ into engagement with the contact $b^3$. This closes a circuit from the source of current E through the conductor 1, the solenoid $a^2$, conductor 2, thermostat $b$, contact $b^3$, conductor 3, a portion of the resistance $a^3$ and conductor 4 to the return conductor 10 and other side of the source E. This short circuits a portion of the resistance $a^3$ so that the solenoid $a^2$ becomes energized to a sufficient degree to close the switch $a$ so as to start the compressing pump A. As the temperature in the chamber $D^2$ falls, the member $b$ will leave its engagement with the contact $b^3$, but the pump A will continue to run owing to the fact that sufficient current flows through the solenoid $a^2$ and the resistance $a^3$ to keep the switch closed. When, however, the temperature has decreased to the desired point, a circuit will be closed through conductor 1, conductor 5, switch member $c$, conductor 6, contact $b^2$, thermostat $b$, conductor 2, and thence through the resistance $a^3$ and conductor 4 to the conductor 10, thus short circuiting the solenoid and permitting the switch $a$ to open.

In cases where the temperature which is to be maintained in the chamber $D^2$ is relatively high, the gases in the refrigerating coils D expand to a high pressure before the temperature in the chamber $D^2$ is affected sufficiently to control the apparatus through the agency of the thermostat $b$. It is desirable, therefore, to provide means for keeping this pressure reduced by causing an operation of the compressing pump A whenever the pressure has reached a point beyond which it is dangerous or undesirable to go. For this purpose, a supplemental controlling device is employed which is directly under the control of the pressure in the coil D, the controlling device being herein shown as the switch member $c$, previously referred to, which switch member is arranged to be operated by means of a movable abutment or diaphragm $d$ in a chamber $d^2$ which receives the pressure in the coil D through a pipe $d^3$. The diaphragm $d$ is connected through a lever $e$ with the switch member $c$, the said switch member thus being longitudinally movable in guides $c^2$ between two sets of contacts $c^3$ and $c^{30}$ and $c^4$ and $c^{40}$, the normal position of the switch member $c$ being that shown in the drawing, the circuit which is then closed by said switch through the contacts $c^3$ and $c^{30}$ being that which stops the operation of the compressing pump A, when the thermostat $b$ is in the position also shown in the drawing. Assuming, however, that the pressure in the coil D exceeds a given point without an increase in temperature in the chamber $D^2$ sufficient to start the pump A through the action of the thermostat $b$, it will be seen that such pressure being admitted to the chamber $d^2$ will act upon the diaphragm $d$, and through the agency of the lever $e$ will close a circuit through the contacts $c^4$ and $c^{40}$. This circuit is through the conductor 1, the solenoid $a^2$, conductor 2, conductor 20, contact $c^4$, switch member $c$, contact $c^{40}$, conductor 7, conductors 3, 4 and 10, so that the current flowing over said circuit will energize the solenoid and start the compressor. The operation of the compressor will then continue until the pressure is sufficiently reduced to permit the operation of the switch member $c$ through the agency of the spring $f$ which will then restore the parts to the position shown, in which they are entirely under the control of the thermostat $b$.

While any form of pressure actuated device may be employed to control the circuit, the device herein shown consists of a diaphragm $d$ clamped or otherwise secured between two members $d^4$ and $d^5$, the lower member forming, in conjunction with the diaphragm, the compression chamber into which the pipe $d^3$ leads, while the upper member constitutes a guide for an actuator $e^2$ which is connected with the lever $e$ pivotally supported at $e^3$. The spring $f$ which is provided with an adjusting follower $f^2$ bears on top of the member $e^2$ in order to hold the parts in the normal position shown. By this construction, the actuator $e^2$ is entirely outside of the pressure chamber $d^2$, and being held in contact with the diaphragm $d$ by means of the spring $f$, requires no fastening devices, so that the diaphragm can be solid and unperforated. Furthermore, all the external connections are outside of the diaphragm chamber so that no stuffing boxes are required and there is no danger of leakage from the chamber. The upper member $d^4$ of the diaphragm support is furthermore shaped so as to afford a solid abutment for the diaphragm when subjected to pressure so that a very thin and sensitive diaphragm can be employed without danger of breakage or leakage.

While the construction hereinbefore described constitutes a practical embodiment of the invention, it is not intended to limit the invention to the specific construction and arrangement of the several instrumentalities employed to attain the desired result, since modifications may obviously be made without departing from the invention.

Claim.

In a refrigerating system, a compressor; an electro-motor to operate said compressor; a source of current to operate said motor; a switch to control a circuit leading from said source of current through said motor; a solenoid and resistance in series with a permanently closed circuit from said source of current, said solenoid controlling the operation of said switch; a shunt circuit around the solenoid including the whole of said resistance; a second shunt circuit around a portion of said resistance and including said solenoid; a thermostatic switch adapted by its movement in one direction or the other to close one or the other of said shunt circuits; a pressure operated switch independent of the thermostatic switch, and adapted to open the first shunt circuit and close the second shunt circuit in response to an increase in pressure; and a diaphragm subjected to the pressure of the gas in the refrigerating coils to operate said pressure operated switch.

In testimony whereof, I have signed my name to this specification in the presence of two subscribing witnesses.

EUGENE CARPENTER.

Witnesses:
  JAS. J. MALONEY,
  W. E. COVENEY.